United States Patent [19]

Stoll

[11] 4,328,829

[45] May 11, 1982

[54] UNIVERSAL MODULE FOR PNEUMATIC FIXED-CYCLE CONTROL

[76] Inventor: Kurt Stoll, Lenzhalde 72, 7300 Esslingen, Neckor, Fed. Rep. of Germany

[21] Appl. No.: 177,343

[22] Filed: Aug. 12, 1980

[30] Foreign Application Priority Data

Aug. 13, 1979 [DE] Fed. Rep. of Germany ....... 2932807

[51] Int. Cl.[3] .............................................. F16K 11/10

[52] U.S. Cl. .......................... 137/624.11; 137/596.14; 137/884

[58] Field of Search ...................... 137/624.11, 624.18, 137/624.2, 624.14, 884, 596, 596.14; 235/201 ME

[56] References Cited

U.S. PATENT DOCUMENTS 4,181,141 1/1980 Stoll et al. .................. 137/624.14 X 4,205,700 6/1980 Bouteelle .................. 137/624.18 X

*Primary Examiner*—Alan Cohan

*Attorney, Agent, or Firm*—Blanchard, Flynn, Thiel, Boutell & Tanis

[57] ABSTRACT

A universal module for a pneumatic fixed-cycle control incorporates a bistable storage circuit having a first two-position valve including an inlet opening connected to an operating pressure source and a servomotor operable to shift the valve slide and connected to a start connecting opening of the bistable storage circuit. The first valve is actuable to provide an output pressure defining an activating signal for a load associated with the module. A second two-position valve acts as an AND-member, has an input opening which is loaded with the activating signal and has a valve slide servomotor which is loaded with a repeating signal. A two-way valve acts as an OR-member that has two inputs connected to stop connecting openings of the module and an output connected to a stop connecting opening of the bistable storage circuit. The first two-position valve of the bistable storage circuit is initially biased under the force of a spring to its closing position. The servomotor of the first two-position valve is connected through a second two-way valve to the start connecting opening of the bistable storage circuit and the output of a third two-position valve. The third two-position valve has a valve slide initially biased by a spring into its pass position. The third two-position valve has an input connected to the output of the first two-position valve, has an output which makes available the activating signal, and has a servomotor connected to the stop connecting opening of the bistable storage circuit.

4 Claims, 7 Drawing Figures

UNIVERSAL MODULE FOR PNEUMATIC FIXED-CYCLE CONTROL

FIELD OF THE INVENTION

The invention relates to a universally usable module for a pneumatic fixed-cycle control.

BACKGROUND OF THE INVENTION

Such a module is described in my German main application No. P 27 04 869.7-53, corresponding to my U.S. Pat. No. 4 181 141, issued Jan. 1, 1980. A complete control stage for a pneumatic load (for example a compressed-air cylinder), aside from such a module, also includes a plurality of input units in the form of pneumatic limit switches, which are operated by the load itself upon reaching pregiven positions, or manually operated valves for starting and stopping the load, for switching from automatic to manual control, for initiating an emergency stop, etc. These input units are identified all together also as a command unit, so that a control stage for a load consists as a whole of a universal module and a command unit.

In the case of the universal module according to my aforementioned U.S. Pat. No. 4 181 141, the associated load can be switched off only in such a manner that the bistable storage circuit is returned to its nonactive condition. To again switch on the load the storage circuit must receive a new start signal. However, it would be advantageous for certain uses if it were also possible to cause the storage circuit to become disabled, or dead, or to prevent all together the actuation of the storage circuit of the module. This can for example be the case, in a fixed-cycle control for a device for conveying of workpieces in several independent directions, if a certain module is supposed to work only during the movement of the workpiece in one direction, but not for the return movement of the empty workpiece carrier in the opposite direction or during return movement of the workpiece to the initial position. If one could selectively disable such a module depending from signals which are given corresponding on said module, then the entire fixed-cycle control can obviously be inserted much more flexibly, for example can control both a forward movement and also a backward movement. Since an entire cycle of a pneumatic conveying mechanism is composed substantially of two almost mirrorlike semi-cycles, one could in many cases make do with a module chain which controls only half of the entire cycle, if there would be the possibility to otherwise consider the small differences between the two semi-cycles. In this way, a considerable savings in modules and at the same time in external pneumatic structural elements and control valves, which are associated with said modules, could be achieved.

Therefore the present invention is supposed to further develop a module according to my above-referenced U.S. Pat. No. 4 181 141, so that the possibility of a total dead, or disabled, position exists, even if all external signals which are usually required for enabling exist.

This task is inventively attained with a module according to the present invention.

In the case of the inventive module, the bistable storage circuit (which in my aforementioned U.S. patent is formed by a two-position valve, which has two stable end positions, with two servomotors), is replaced with two two-position valves, which are connected in series along the signal flow path and each have one servomotor, of which the first is initially biased into the closing position by spring force and the one farther along the signal flow path is initially biased into the open position by spring force. The output opening of the second two-position valve is connected to an input opening of a further two-way valve which defines an OR-member, the other input opening of which is connected to the start connecting opening of the module. The output of said further two-way valve is connected to the servomotor of the first two-position valve. Through this arrangement one obtains a separately existing feedback line, which can be interrupted selectively to render the module totally dead, or disabled. If the feedback loop of the bistable storage circuit which is formed by the two two-position valves is closed, then the module operates just like a module according to my above-referenced U.S. patent.

Part of this feedback line is advantageously an external connecting line which is connected to the auxiliary connecting openings of the module, which connecting line can be particularly easily blocked or released, by providing in it a suitable further two-position valve.

If the module is totally disabled by interrupting the feedback line (the associated load is not switched on), one can still obtain, at that connecting opening of the module which makes available the activating signal, a short signal for so long as the starting signal is applied to the module itself. While the disabled module thus does not activate its associated load, it still does not interrupt the chain of the fixed-cycle control.

The additional possibility of a disabling of a module also opens up new possibilities in the external switching for the formation of a control stage together with a corresponding command unit and moreover makes the entire fixed-cycle control neater and simpler.

BRIEF DESCRIPTION OF THE DRAWINGS

The invention will be discussed hereinafter in greater detail in connection with exemplary embodiments with reference to the enclosed drawings, in which.

The present invention is a further development of the invention disclosed in my U.S. Pat. No. 4 181 141 above mentioned, to which reference is made.

DETAILED DESCRIPTION

Figure 1:
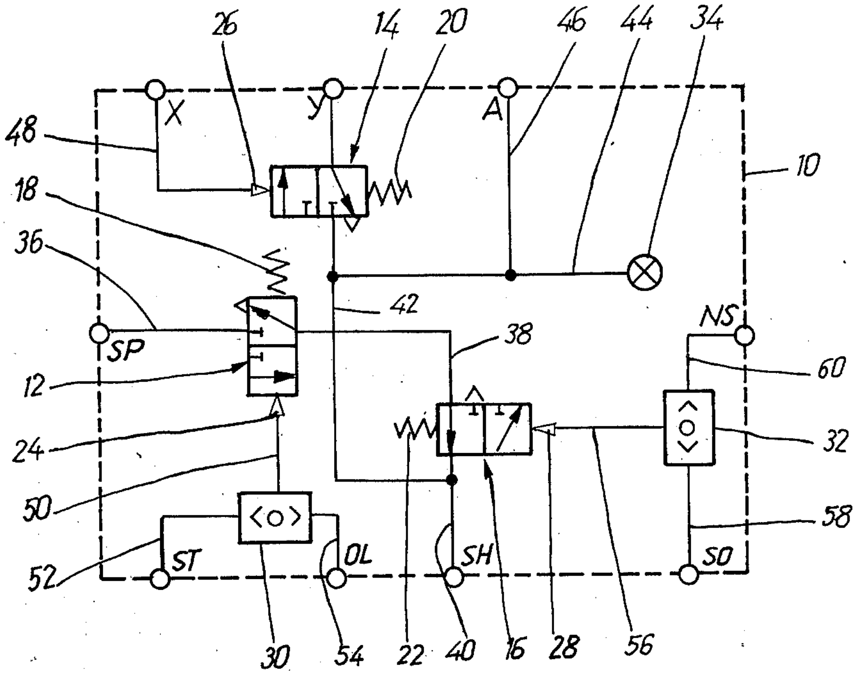
FIG. 1 illustrates a block diagram of a universally usable module for pneumatic fixed-cycle controls.

FIG. 1 of the accompanying drawings illustrates a universal module, which embodies the present invention and is identified as a whole by reference numeral 10, for building of various control stages for associated pneumatic loads, in particular for building of successive control stages of a cyclically operating pneumatic fixed-cycle control.

The module 10 contains three valves of two position type, here 3/2-valves 12, 14, 16, the valve slide of each of which is initially biased by an associated spring 18, 20, 22 into the closing/ventilating position (valves 12 and 14) or the pass position (valve 16) and which can be pressed into the pass position (valves 12 and 14) or the closing/ventilating position (valve 16) through servomotors 24, 26 or 28 which are indicated by triangles.

The module 10 contains furthermore two two-way valves 30 and 32 and a pressure indicator 34.

The above-mentioned valves are interconnected as follows:

An inlet opening of the valve 12 is connected through a line 36 to a connecting opening SP of the module 10, at which is present the supply pressure which has been made available from a compressed-air source. The output of the valve 12 is connected through a line 38 to the input of the valve 16. The output of the latter is connected through a line 40 to an auxiliary connecting opening SH of the module, through a line 42 to the input of the valve 14, through a further line 44 branching from line 42 to the pressure indicator 34, and through a line 46 branching from the line 44 to a connecting opening A of the module. A pneumatic load, which is controlled by the module 10, for example a compressed-air cylinder, can be connected to the latter connecting opening A. The output of valve 14 is connected to a connecting opening y, at which opening a pneumatic activating signal is transmitted to a different module.

The servomotor 26 of the valve 14 is connected through a line 48 to a connecting opening X of the module, which is loaded with a repeating signal, which is made available for example by a pneumatic limit switch which is operated by the pneumatic loads. The servomotor 24 of the valve 12 is connected to the output of the two-way valve 30 through a line 50. The two-way valve 30 is connected with one of its inputs through a line 52 to a connecting opening ST of the module, which can be loaded from outside with a pneumatic starting signal; the other input of the two-way valve 30 is connected through a line 54 to a further auxiliary connecting opening DL. The servomotor 28 of the valve 16 is connected through a line 56 to the output of the two-way valve 32. One input of the latter is connected through a line 58 to a connecting opening SO, which can be loaded with a pneumatic stop signal, the second input of the two-way valve 32 is connected through a line 60 to a connecting opening NS of the module, which opening can be loaded with a pneumatic emergency-off signal.

Figure 2:
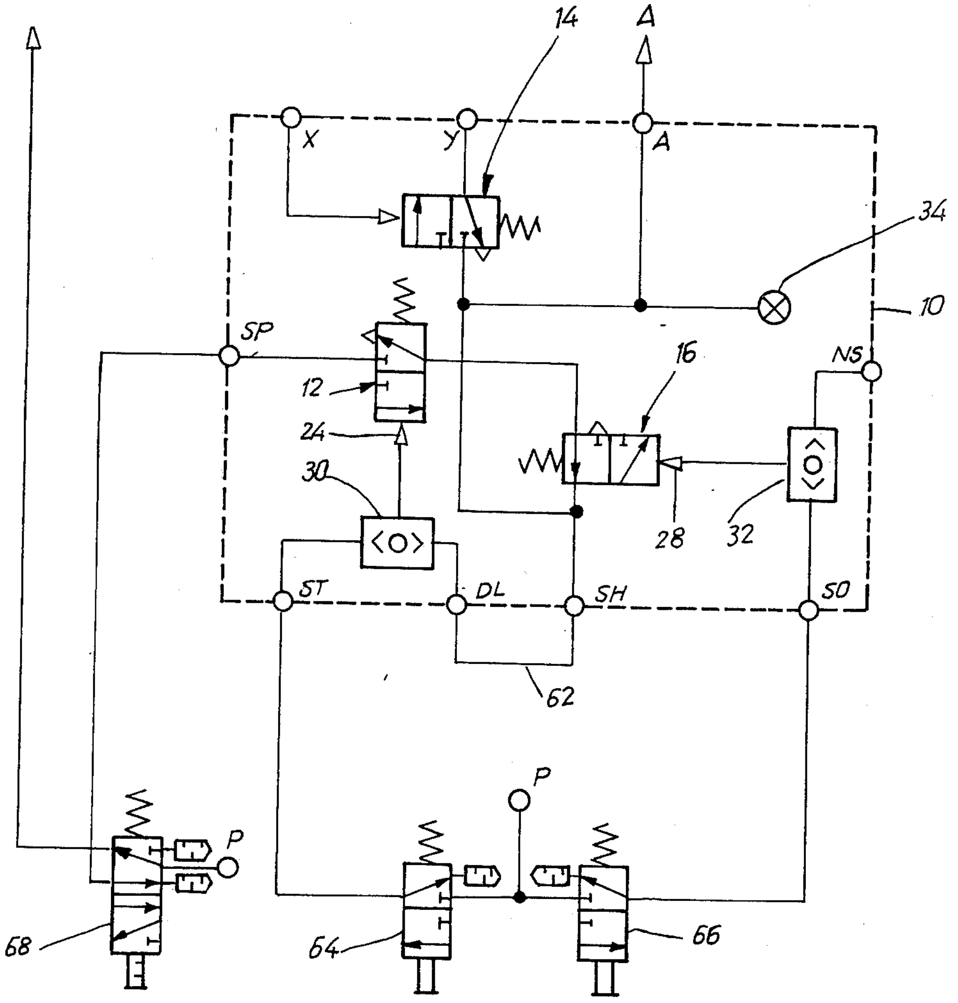
FIG. 2 illustrates a block diagram of a first control stage for a pneumatic load, which contains a module according to FIG. 1.

FIG. 2 illustrates the use of the module 10 in a simple start/stop control stage for a pneumatic load. The auxiliary connecting openings SH and DL are connected through an external connecting line 62. The connecting opening ST can be connected through a 3/2 starting valve 64 which can be moved against spring force into the open position, namely open to the compressed-air source P. The connecting opening SO can similarly be connected through a 3/2 stopping valve 66 to the compressed-air source P. A 5/2 reversing valve 68 is adjustable for selecting manual or automatic operation. The reversing valve 68 in its "AUTO" position connects the connecting opening SP of the module to the compressed-air source P and in its "MAN" position relieves the pressure in the connecting opening SP while at the same time emitting a control signal MAN. The connecting openings X, y, A and NS of the module are not occupied and are closed off by plugs.

The start-stop control stage according to FIG. 2 operates as follows:

If the reversing valve 68 is in the "MAN" position, the connecting opening SP is loaded with atmospheric pressure and an output signal zero is always obtained at the connecting opening A, even when the starting valve 64 is operated.

When the reversing valve 68 is in the position "AUTO" and if the starting valve 64 is operated, then the servomotor 24 is loaded with pressure through the two-way valve 30 and moves the valve slide of the valve 12 into the pass position. Thus pressure accumulates at the input of the valve 16, and this pressure is transmitted by the valve 16 to the auxiliary connecting opening SH and through the connecting line 62 and the auxiliary connecting opening DL to the second input of the two-way valve 30. In this manner an automatic-holding circuit for the valve 12 is completed, and a pressure signal is still obtained at the connecting opening A even when the starting valve 64 is released and returns to its unactuated position. In order to end the pressure signal at the connecting opening A, the stop valve 66 is operated, which causes the servomotor 28 to be connected to the compressed-air source P and moves the valve slide of the valve 16 into the closing position. With this the pressure signal at the connecting opening A ends and at the same time the pneumatic feedback (holding) signal on the servomotor 24 is also interrupted, so that the pneumatic bistable tumbler switch which is formed by the valves 12, 16 and 30 and the connecting line 62 drops its output pressure permanently. From the explanations in the last paragraph it is furthermore clear, that one obtains a drop in output pressure of this bistable switch also when one moves the reversing valve 68 into the position "MAN".

Figure 3:
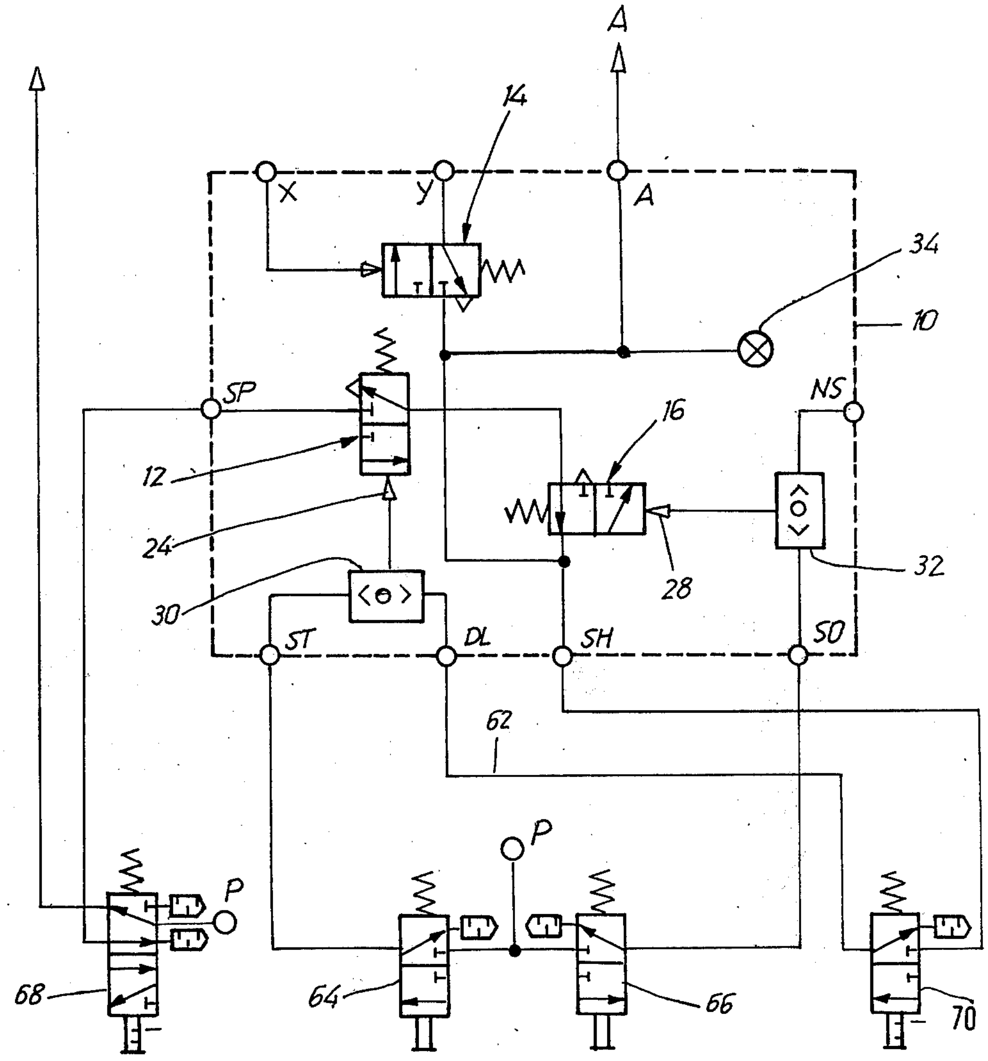
FIG. 3 illustrates a block diagram of a second control stage for a pneumatic load, which contains a module according to FIG. 1.

FIG. 3 illustrates a modified pneumatic start/stop control stage, in which parts which have been discussed in reference to FIG. 2 are again identified with the same reference numerals. A 3/2 reversing valve 70 for the clockwise and counterclockwise rotation is additionally inserted into the connecting line 62. One recognizes that an automatically holding pneumatic bistable tumbler switch is obtained only when the slide of the reversing valve 70 is moved against the force of its initial biasing spring into the pass position. Thus it is possible to program the operations of the module 10 by means of this external reversing valve 70 as follows: In the blocking position of the valve 70 the pressure signal at the connecting opening A lasts just as long as the starting signal at the connecting opening ST, and thus just as long as the starting valve 64 is operated. However, in the pass position of the reversing valve 70, a short operation of the starting valve 64 produces a lasting pressure output signal at the connecting opening A, which usually is ended only by operating the stopping valve 66, but can be ended earlier, namely by moving the reversing valve 70 back into its closing position or by moving the reversing valve 68 back into its "MAN" position.

Figure 4:
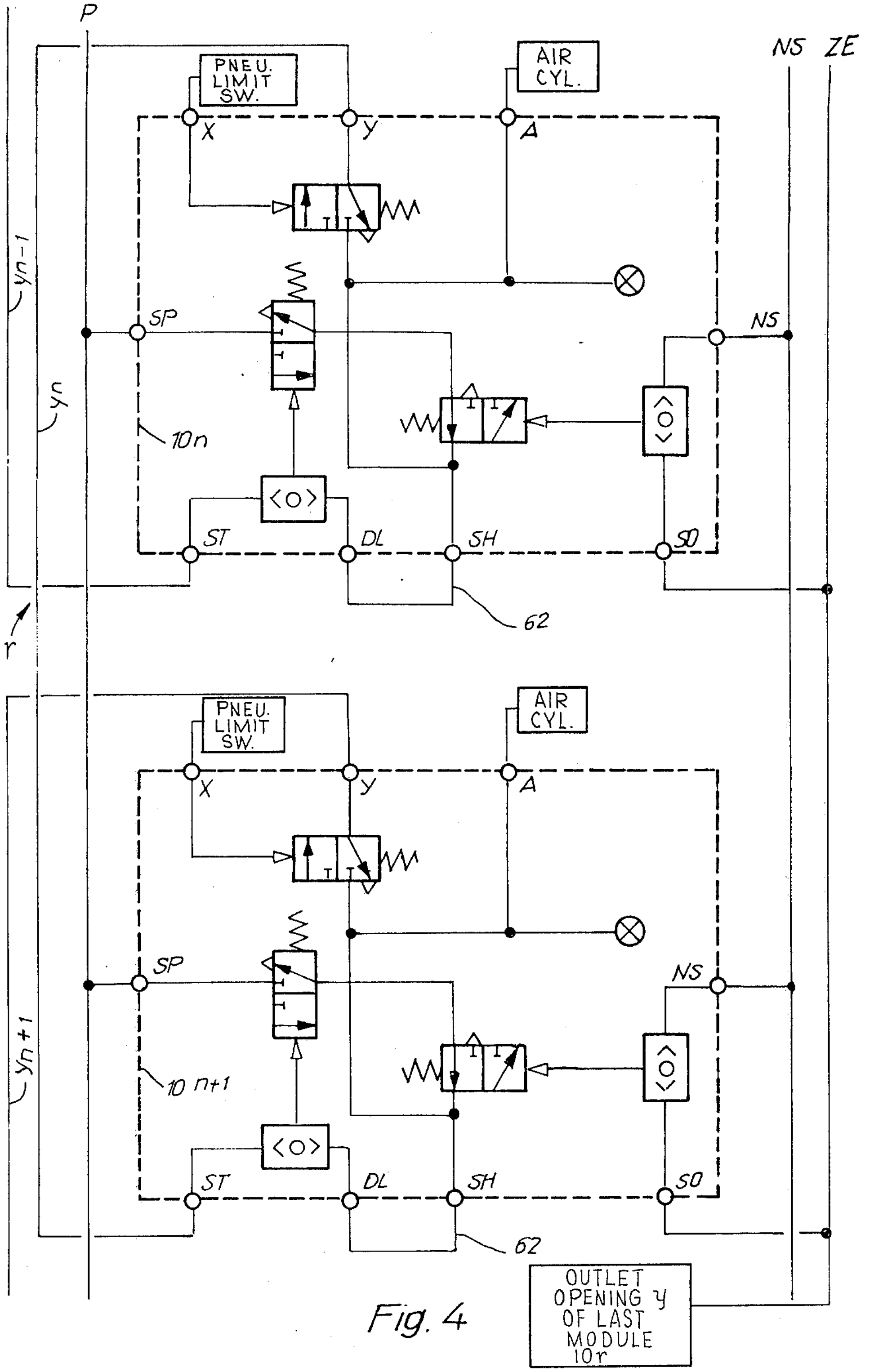
FIG. 4 illustrates a block diagram of two successive control stages of a cyclically operating fixed-cycle control for several pneumatic loads with modules according to FIG. 1.

FIG. 4 illustrates a section from the control-stage chain of a pneumatic fixed-cycle control for a plurality of compressed-air cylinders, through which the compressed-air cylinders are shifted successively from a rest position into an operating position and are locked in such operating position under pressure, until the entire cycle has completed. For this the fixed-cycle control r has modules $10_1$ to $10_r$, of which the modules $10_n$ and $10_{n+1}$ are shown in FIG. 4.

In all modules 10 the auxiliary connecting openings SH and DL are short-circuited through a connecting line 62, so that each module contains a pneumatic bistable tumbler switch, as has already been discussed above with reference to FIG. 2. All connecting openings SP of the modules are connected to a common pressure line P. Similarly, all connecting openings NS are connected to a common emergency-off line NS. The connecting openings SO of all modules are connected to a common cycle-end line ZE, which in turn is connected to the output opening y of the last module $10_r$, which output opening y makes available the activating signal for a different control stage.

The connecting openings A of the various modules are each connected to the associated compressed-air cylinders. The connecting openings X of the modules are connected to pneumatic limit switches, which each operate upon reaching the end position of the compressed-air cylinder associated with the corresponding module to pressurize the connecting opening X of that module and thereby shift the corresponding valve 14 to apply high pressure to the connecting opening y thereof. The connecting opening ST of one module is connected in each case to the connecting opening y of the preceding module, such that the high pressure appearing at the latter provides the starting signal at connecting opening ST.

One recognizes that in this manner the automatically succeeding pressure loading of the various compressed-air motors is obtained, which during normal operation is ended only when the last module $10_r$ makes available the activating signal $y_r$, which indicates that the entire cycle has taken place. The bistable tumbler switches of the individual modules are then returned to their initial, or rest, condition in which the various loads are not supplied with compressed air.

One recognizes from the above examples of use, that the above module 10 which has been described in detail with reference to FIG. 1 can be used in many ways.

Figure 5:
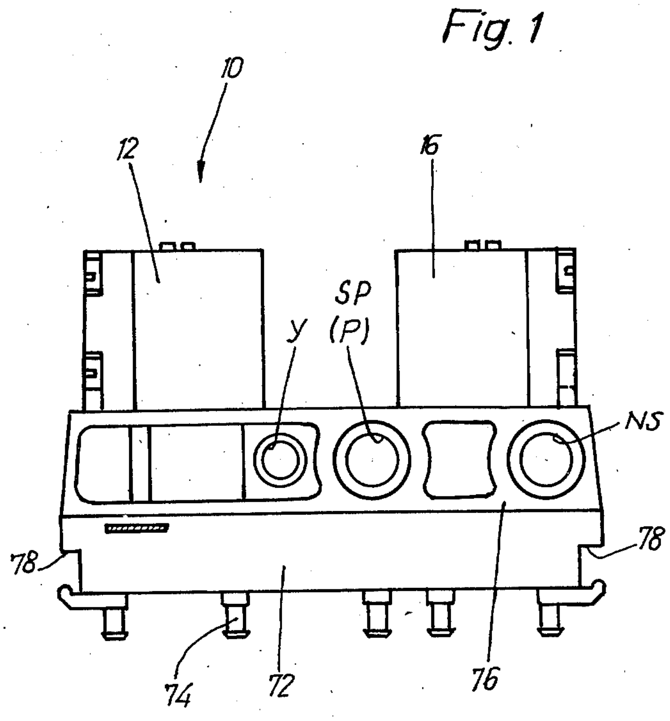
FIG. 5 is a front elevational view of a practical exemplary embodiment of the module according to FIG. 1.
Figure 6:
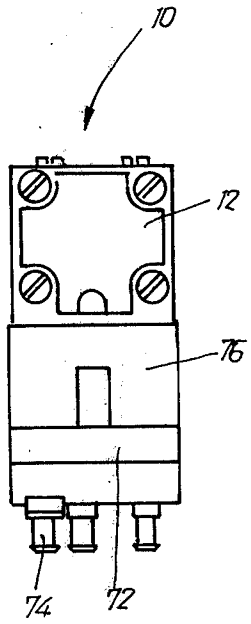
FIG. 6 is an end elevational view of the module according to FIG. 5.

FIGS. 5 and 6 show that a module 10 consists, viewed mechanically, of four main parts:

A connecting plate 72 has nipples 74 for mounting of pressure hoses. Said nipples are connected to those connecting openings of the module, to which access is necessary during the building of fixed-cycle controls. These are particularly the connecting openings A and X. Connecting openings, which in the case of fixed-cycle controls are connected either to the preceeding or the next following module or which are common to all modules, are, however, provided in the front and back surfaces of a module member 76. These particularly include the connecting openings SP, y and NS on the front side shown in FIG. 5 and connecting opening ST on the back side not shown in FIG. 5, of the module member 76, so that with modules placed side-by-side, the opening y of one communicates with the opening ST of the next. The module member 76, by the way, contains the various lines 36 to 60, the pressure indicator 34 and the valve 14. The two valves 12 and 16 are mounted on the module member 76.

Through a simple close side-by-side placement of the front surfaces of the module members 76, the most important ones of the connections between successive modules are therefore already created. To assure a clean alignment of successive modules 10, the connecting plate is provided with recesses 78, through which it is mounted on fastening rails which are common to all modules.

In the embodiment shown in FIG. 4 one of the various modules can be rendered inoperative by interrupting or eliminating the connecting line 62 associated thereto. In such case no pneumatic holding circuit can be established and the load connected to opening A of the module will not be energized. In order to provide a signal at the output opening y in spite of the fact of the load not reaching its end position thus not operating the pneumatic limit switch associated thereto, the load opening A can be directly connected to the input port X so as to switch valve 14 into the conducting position. In this way the next module as seen in the direction of signal flow will receive a start signal essentially at the same time a start signal is supplied to the preceding module.

Figure 7:
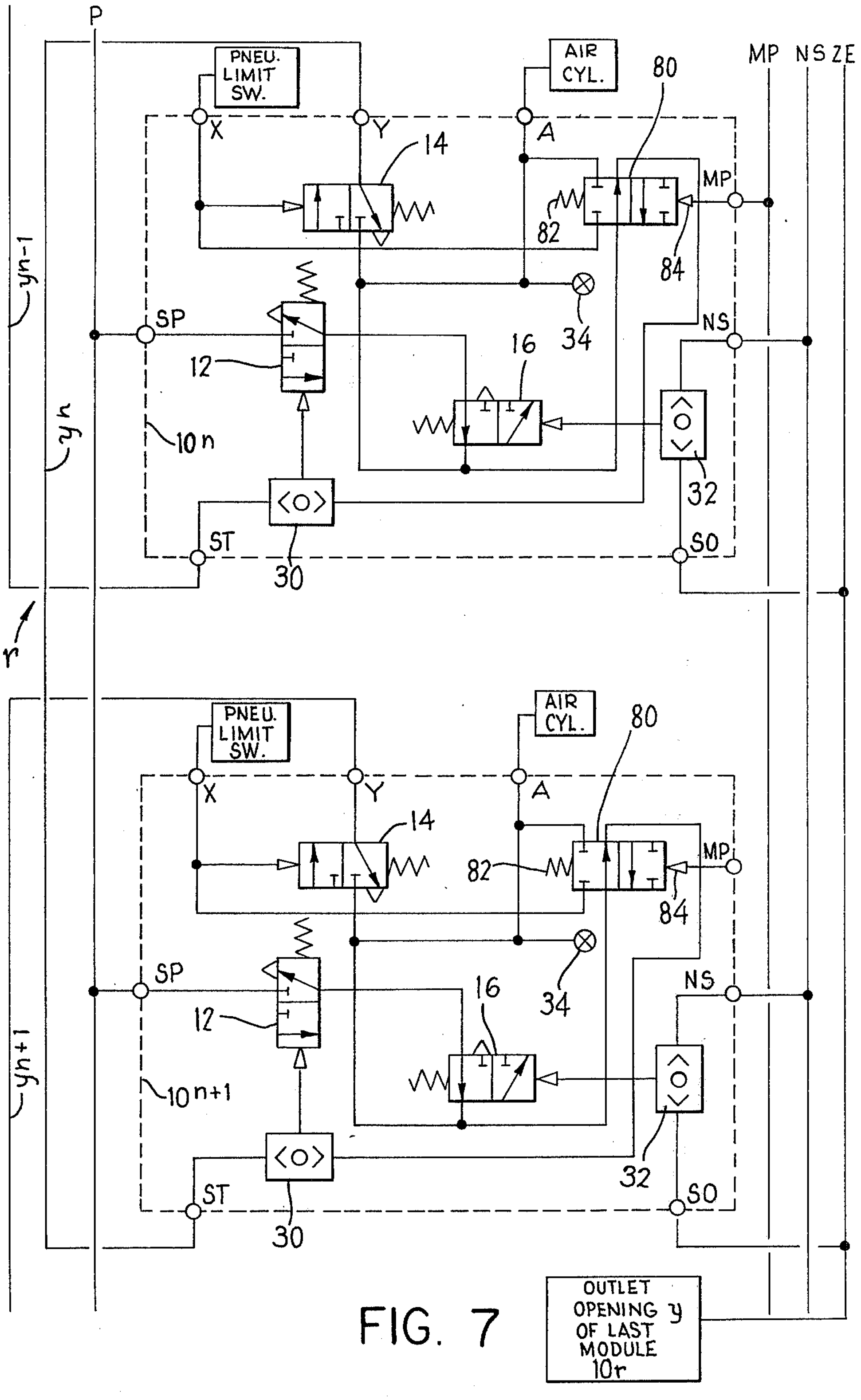
FIG. 7 illustrates a block diagram similar to the one shown in FIG. 4 but including pneumatically mode-programable control stages.

If it is desired that a module can be rendered inoperative and caused to directly relay the starting signal received to the succeeding module without modifying the external connections, the module may be further improved by incorporating further two-position valve, here a 4/2-valve 80 shown in FIG. 7. Valve 80 is positioned into a first operating position by a spring 82 and can be switched into a second operating position by energizing a pneumatic servomotor 84.

As may be seen from the drawings the energizing port of the servomotor 84 is connected to a mode programming port MP of the module, which ports may be selectively connected to a mode programming line also identified by MP.

In its first operating position valve 80 interrupts fluid communication between the load port A and the ready signal receiving port X, while providing for fluid connection between the outlet port of valve 16 and the associated input port of shuttle valve 30. In its second operating position valve 80 will, inversely, provide for fluid connection between the load port A and the ready signal receiving port X while interrupting the fluid connection between valve 16 and shuttle valve 30.

In the fixed-cycle control of FIG. 7 module 10n has its mode programming port MP connected to the mode programming line, while the mode programming port of module $10_{n+1}$ is permanently vented. By supplying a pneumatic signal to the mode programming line valve 80 of module 10n is switched into its second operating position such that the feedback line between valve 16 and shuttle valve 30 is interrupted. Thus there is no bistable storage capability of the module. Furthermore the load port A is connected to the ready signal receiving port X, and consequently the start signal received at port ST will result in a trigger signal for equal duration provided at port y, which will immediately start operation of the succeeding module $10_{n+1}$.

Contrarily, module 10n will perform its normal load energizing control function, when no signal is received at port MP, and in such case the succeeding stage $10_{n+1}$ will be started upon receipt of the output signal of the pneumatic limit switch associated to the module 10n.

From the above description of the embodiment shown in FIG. 7 it is also clear, that module $10_{n+1}$ will always perform its load energizing control function irrespective of the pressure conditions prevailing in the mode programming line MP.

Though particular preferred embodiments of the invention have been disclosed in detail for illustrative purposes, it will be recognized that variations or modifications of the disclosed embodiments including the rearrangement of parts lie within this scope of the present invention.

The embodiments of the invention in which an exclusive property or privilege is claimed are defined as follows:

1. In a universal module for a pneumatic fixed-cycle control, said module incorporating a bistable storage circuit having a first two-position valve, said valve having an input opening connected to an operating-pressure source, said valve having a servo-motor operable to shift the valve slide and connected to a start connecting opening of the bistable storage circuit, said first valve being actuable to provide an output pressure from which there is derived an activating signal for a load associated with the module, a second two-position valve acting as an AND-member, which AND-member has an input opening which is loaded with said activating signal and a valve slide servomotor which is loaded with a repeating signal, and a two-way valve acting as an OR-member and the two inputs of which are connected to stop connecting openings of the module and the output side of which is connected to a stop connecting opening of the bistable storage circuit, the improvement being comprised in that said first two-position valve of the bistable storage circuit is initially biased under the force of a spring to its closing position, said servomotor of said first two-position valve is connected through a second two-way valve to the start connecting opening of the bistable storage circuit and the output of a third two-position valve, said third two-position valve having a valve slide initially biased by a spring into its pass position, said third two-position valve having an input connected to the output of the first two-position valve, and an output which makes available said activating signal and a servomotor connected to said stop connecting opening of the bistable storage circuit.

2. A module according to claim 1, wherein the output of the third two-position valve and the second input of the second two-way valve are connected to respective auxiliary connecting openings of the module, which are connected through an external connecting line which closes a feedback loop of the bistable storage circuit.

3. A module as in claim 1, wherein a fourth two-position valve is provided which is biassed into a first operating position and can be moved into a second operating position by a pneumatic servomotor associated thereto, said fourth two-position valve providing for fluid communication between the outlet opening of the third two-position valve and the associated inlet opening of the second two-way valve while interrupting a signal path extending from a pressure fluid source to the valve slide servomotor of the second two-position valve, and said fourth two-way valve in its second operating position providing for fluid communication between said pressure air source and the valve slide servomotor of the second two-position valve while interrupting the fluid flow between the third two-position valve and the associated inlet opening of the second two-way valve.

4. A module as in claim 3, wherein the air pressure source is formed by the output pressure of the first two-position valve.

* * * * *